Nov. 14, 1967   W. W. DOLLISON   3,352,269
FLOATING WORK PLATFORM
Filed Oct. 23, 1964   3 Sheets-Sheet 1

INVENTOR
William W. Dollison
BY
ATTORNEYS

Nov. 14, 1967  W. W. DOLLISON  3,352,269

FLOATING WORK PLATFORM

Filed Oct. 23, 1964  3 Sheets-Sheet 3

INVENTOR
William W. Dollison

BY *Hastings Ackley and Walter J. Jay*

ATTORNEYS

United States Patent Office 3,352,269
Patented Nov. 14, 1967

3,352,269
FLOATING WORK PLATFORM
William W. Dollison, Dallas, Tex., assignor to Otis Engineering Corporation, Dallas, Tex., a corporation of Delaware
Filed Oct. 23, 1964, Ser. No. 406,203
17 Claims. (Cl. 114—.5)

This invention relates to floating work platforms. More particularly this invention relates to floating work platforms having a variable draft so that the platforms may be used at water depths ranging from very shallow to very deep.

It is an object of this invention to provide a new and improved type of floating work platform for supporting equipment and/or personnel above the surface of the water while conducting offshore operations in connection with activities such as the drilling and servicing of oil wells.

It is a very important object of this invention to provide a floating work platform which has a variable draft which will allow the platform to be used in all depths of water.

It is another object of this invention to provide a floating work platform which, when used in shallow water, is in the form of a catamaran type vessel having a minimum draft.

It is another important object of the invention to provide a variable draft floating work platform which, when rigged for maximum draft, comprises a column-stablized craft with a very long period of roll.

It is a further object of the present invention to provide a variable draft floating work platform having elongated float chambers which may be mechanically moved between positions ranging from the horizontal when the platform is rigged for minimum draft to the vertical when the platform is rigged for maximum draft operation.

It is another object of the invention to provide a variable draft floating work platform having pivotally mounted elongated float chambers which are actuatable between a horizontal position and a vertical position by means of a ballasting procedure wherein the float chambers are selectively flooded to effect movement between the positions.

It is a still further important object of the invention to provide a variable draft floating work platform which may be used in all types of water covered locations ranging from inland waterways to far offshore ocean locations with such a craft being capable of stable operations under all conditions.

It is an additional object of the invention to provide a variable draft floating work platform which when rigged for maximum draft operations provides maximum transparency to wave action.

It is a further object of the invention to provide a variable draft type floating work platform which may be maneuvered under its own power whether rigged for maximum or minimum draft operation.

It is another important object of the present invention to provide a variable draft floating work platform having a deck which may be maintained at a substantially uniform distance above the surface of the water during the conversion of the platform between a condition for operation at one draft to a condition for operation at another draft and when the platform is rigged for maximum or minimum draft operations.

Additional objects and advantages of the invention will be readily apparent from the reading of the following description of a device constructed in accordance with the invention, and reference to the accompanying drawings thereof, wherein.

Figure 1:
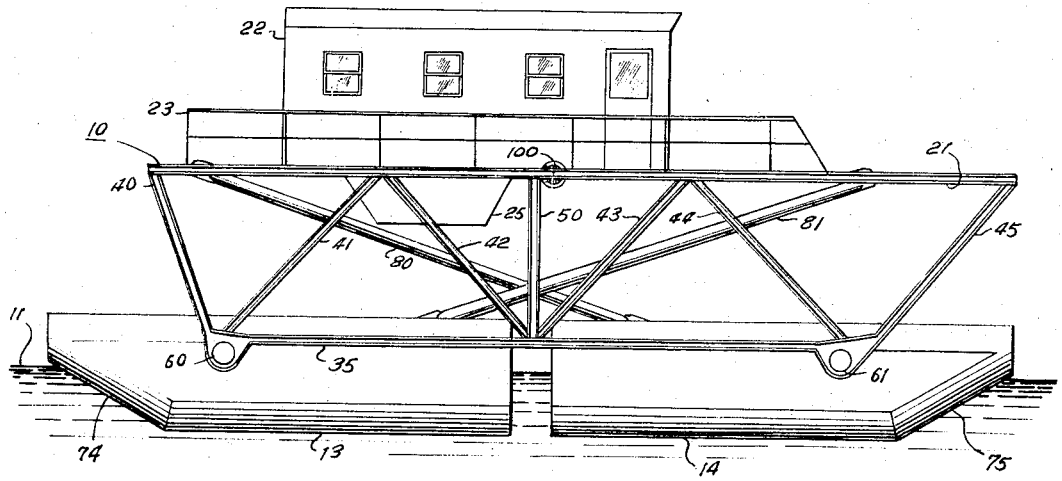
FIGURE 1 is a side view in elevation of the variable draft floating work platform rigged for minimum draft operation.

Referring to the drawings, the work platform embodying the invention includes a rectangular deck 10 supported above the surface 11 of a body of water 12 by a plurality of elongated float chambers 13, 14, 15 and 20. For purposes of reference, the float chambers 14 and 15 will be considered forward or front float chambers while the float chambers 13 and 20 will be considered as rear or back float chambers. Assuming that the starboard or right side of the platform is presented in FIGURE 1, the float chambers 13 and 14 are located on the right side while the float chambers 15 and 20 are located on the port or left side of the platform. The float chambers are oriented in such positions that their long or longitudinal axis extends along the length and parellel to the sides of the deck. The float chambers are movable from a position for minimum draft operation, as illustrated in FIGURE 1, to a position for maximum draft operation, illustrated in FIGURES 2 and 3.

Figure 3:
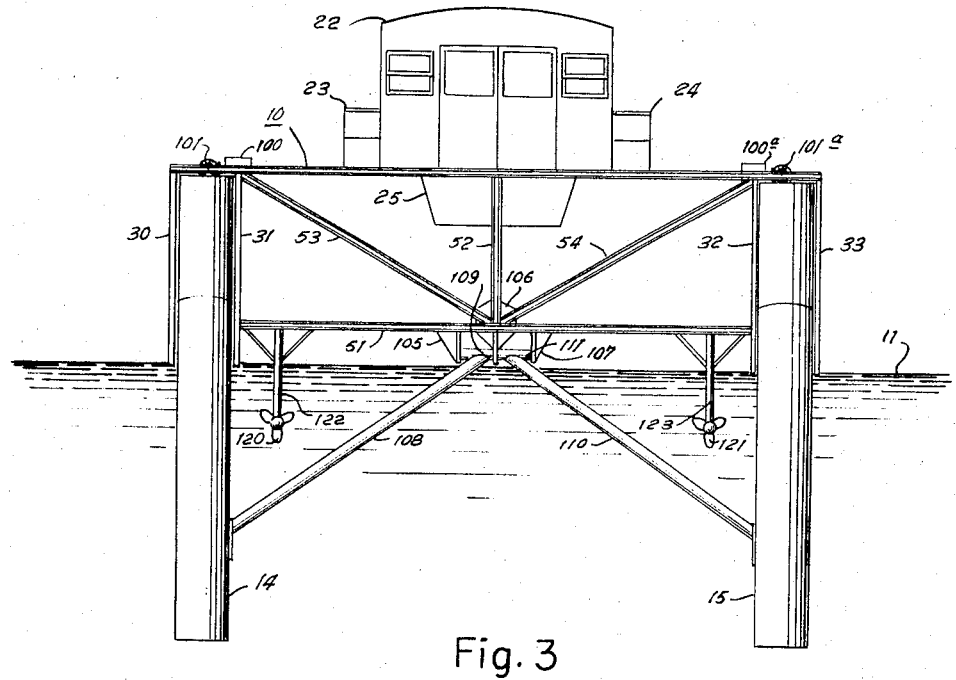
FIGURE 3 is an end view in elevation of the platform rigged for maximum draft operation.

The deck 10 is constructed of any suitable decking or flooring material, such as expanded metal, supported on horizontal members 21. Secured on the deck is a deck house 22 which may be used for any desired purpose such as equipment and supply storage or personnel housing. The deck house is securely fastened to the deck by any suitable means such as bolts so that it will remain in position during any pitching or rolling action of the deck occasioned by the state of the water in which the platform is floating. Secured along each side of the deck house to the deck are safety rails 23 and 24. Suspended below the deck is an engine compartment 25. The deck 10 is secured to a plurality of longitudinal trusses 30, 31, 32 and 33, as illustrated in FIGURE 3. Since all of the trusses are identical in form and construction, only the truss 30 which is fully visible in FIGURE 1, will be completely described. Referring to FIGURE 1, the truss 30 comprises one of the upper horizontal members 21 interconnected with a lower horizontal member 35 by a plurality of angular members 40, 41, 42, 43, 44 and 45 and a vertical member 50 running perpendicular to the upper and lower horizontal members. The member 21 is common to the deck supports and the truss. Additional longitudinal members 21 which are not part of one of the trusses are interposed between the trusses to support the decking material. The combination of horizontal, angular and vertical members forming the truss provides a light, rigid structure which will withstand operations at sea.

Referring to FIGURE 3, it may be seen that the trusses are secured at the top to the deck 10 with all the trusses being positioned vertical to the deck and parallel to each other. The trusses 30 and 31 extend along the right side of the platform parallel to and spaced apart from each other a sufficient distance to accommodate the float chambers, while the trusses 32 and 33 are similarly positioned down the left side of the platform. To provide for the lateral rigidity of the longitudinal trusses, they are interconnected as illustrated in FIGURE 3 by a plurality of vertical, horizontal, and angular members which in effect form a plurality of lateral trusses transverse to and along the length of the platform. Specifically, referring to FIGURE 3, each of the lateral trusses comprises a lower horizontal member 51 connected to a vertical member 52 with angular members 53 and 54 extending between the deck and the lower horizontal member. The end members of the lateral trusses are, of course, also a part of the longitudinal trusses For example, the member 45 is common to both a longitudinal and a lateral truss. The number of lateral trusses used will depend upon the rigidity demanded of the structure under operating conditions at sea. Normally, three of the trusses will be used with the one located at each end of the platform structure and one positioned approximately in the middle of the structure.

The longitudinal trusses fulfill multiple functions the most important of which are to secure the float chambers to the platform and to support the deck at the desired elevation above the surface of the water. Each of the float chambers is pivotally secured between a pair of the longitudinal trusses. Specifically, the float chambers 13 and 14 are pivotally connected between the trusses 30 and 31 while the float chambers 15 and 20 are pivotally secured between the trusses 32 and 33. Referring to FIGURE 1, the float chamber 13 is secured between the trusses 30 and 31 by a pin 60 which extends through and is secured to the float chamber with the ends of the pin appropriately journaled in the trusses. The pivot point between the float chamber and truss is located about at the water line so that when the float chamber is rotated the deck will not change elevation. The pin 60 extends along an axis transverse to the longitudinal axis of the float chamber. The float chamber 14 is similarly pivotally secured to the trusses 30 and 31 by a pin 61. In the same fashion the float chambers 15 and 20 are each interconnected with the longitudinal trusses 32 and 33 by a pin, not shown.

Figure 2:
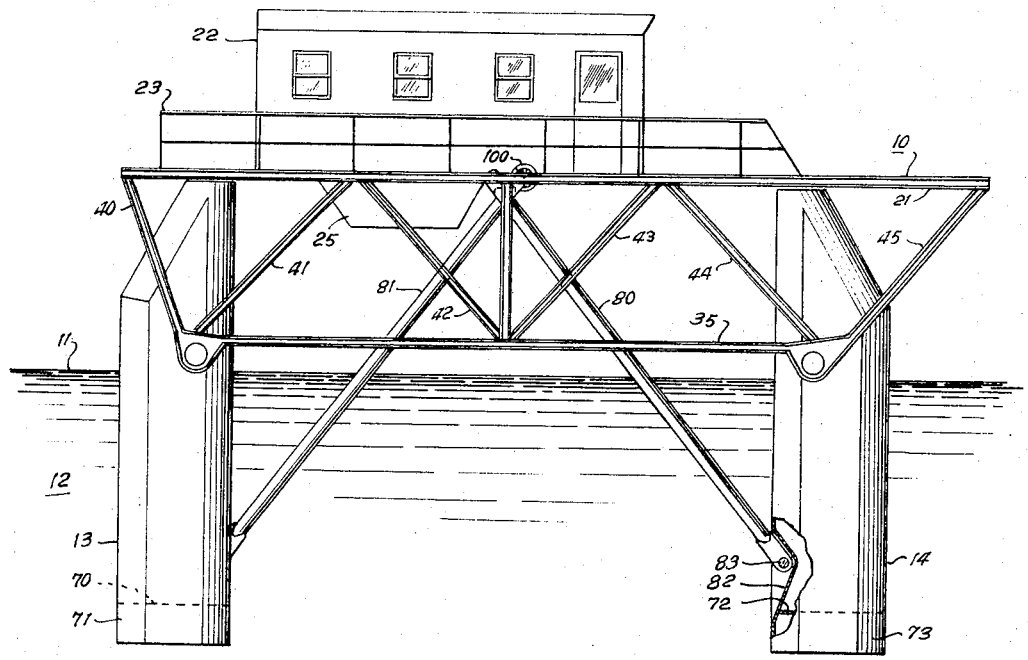
FIGURE 2 is a side view in elevation of the platform rigged for maximum draft operation.

Each of the float chambers is a buoyant structure of hollow construction which preferably has several inner compartments useful both for fuel storage and for ballasting purposes. For purposes of illustration only, a lower compartment for fuel is shown in the float chambers. Referring to FIGURE 2, an inner wall 70 within the float chamber 30 provides fuel compartment 71 in the bottom end of the float chamber, the bottom end being considered as that end which is lowest when the chamber is in vertical position as illustrated in FIGURES 2 and 3. The float chamber 13 has an inner wall 72 providing a fuel chamber 73 in its lower end. Those compartments of the float chamber used for ballasting are equipped with suitable valves and pumps for admitting water into and discharging water from the chambers. The float chambers 15 and 20 are similarly provided with inner walls forming compartments including a fuel compartment in each of their lower ends.

Each of the float chambers may be constructed in any desired shape which will provide maximum stability to the floating structure while presenting minimum drag or friction when the structure is being moved between different locatons in the water. Also, that portion of each float chamber which is movable down into the water is sized to have the buoyancy to keep the platform at the same level as when the float chamber were in horizontal position. For example, the float chamber 13 is provided with an angular, upwardly sloping bottom surface at the outward end 74 and the float chamber 14 is provided with a similar surface 75, the surfaces 74 and 75 contributing to the stability of the platform both when at rest and under way. The surfaces 74 and 75 reduce the drag on the float chambers when the platform is being moved and when the currents are flowing past the platform when it is at rest. The long dimension or length of each of the platforms is substantially greater than its maximum cross-sectional dimension. It is preferable that each of the float chambers be several times as long as its maximum width. As is obvious from the drawings, the float chambers are movable about the pivot point or point of connection with the trusses to position the major portion of each float chamber in the water. Each float chamber is pivotable about an axis which extends substantially perpendicular to the longitudinal axis of the float chamber.

FIGURE 1 illustrates the float chambers in horizontal position for minimum draft operation of the work platform. In this position the longitudinal axis of each of the float chambers lies substantially parallel to the deck 10. With the float chambers in this position the platform is operable in very shallow water, depending, of course, upon the draft necessary to support the weight of the structure of the platform together with any cargo or equipment and/or personnel supported by the platform. The float chambers may be moved to a vertical position in which the longitudinal axis of each of the float chambers extends substantially perpendicular to the deck, as illustrated in FIGURES 2 and 3.

The float chamber 14 is pivotable between horizontal and vertical position by an arm 80 while the float chamber 13 is similarly pivotable between horizontal and vertical positions by an arm 81. The float chambers 15 and 20 are pivotable by the arms 80a and 81a, respectively. A typical connection between the arms and the float chambers is illustrated in connection with the float chamber 14 in FIGURE 2. The float chamber is provided with a socket defined by the contoured surface covering 82. The lower end of the arm 80 is pivotally connected to the float chamber 14 by a pin 83. While not shown in the drawings, the pivotal connection between the lower ends of the remaining arms and the floats are substantially identical to the arm connection with the float chamber 14.

Figure 5:
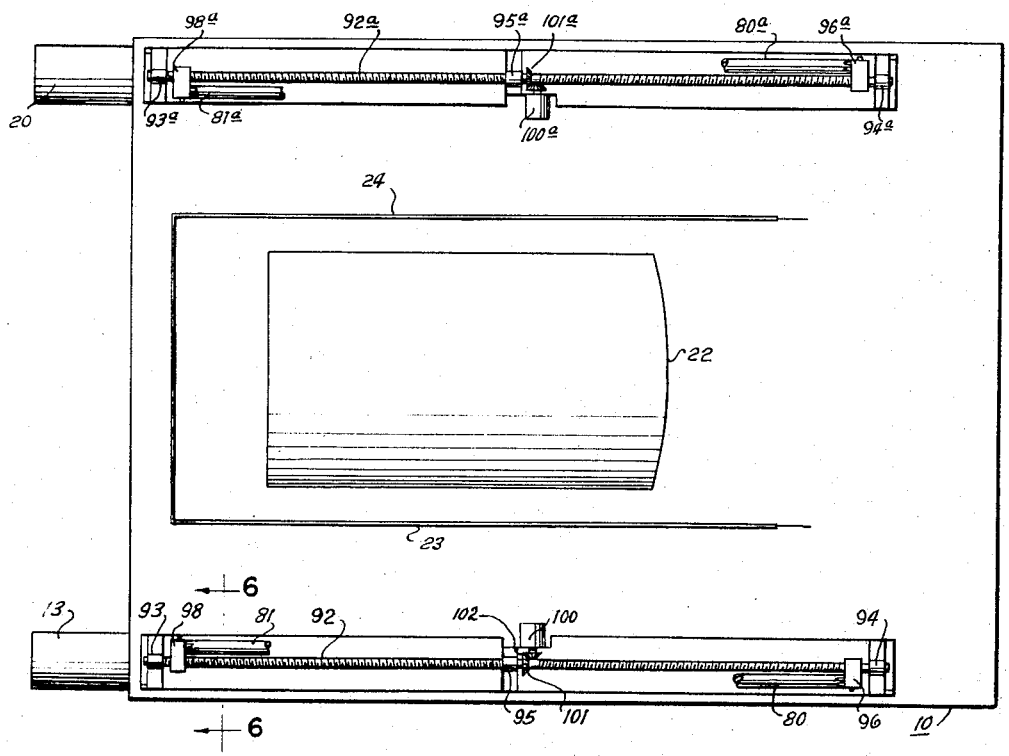
FIGURE 5 is a top view in elevation of the platform.
Figure 6:
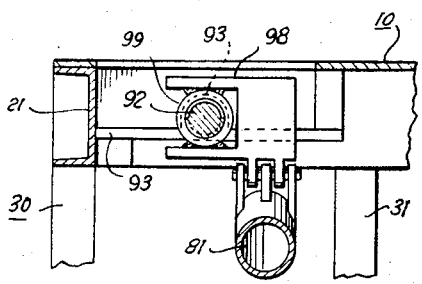
FIGURE 6 is a fragmentary view in section and elevation along the line 6—6 of FIGURE 5.

The apparatus for actuating the float chambers between horizontal and vertical positions is illustrated in FIGURE 5. An externally threaded shaft 92 is positioned substantially parallel to and near the right or starboard side of the deck aligned about mid-point between the trusses 30 and 31. The threads extending from near the center of the shaft to one end are right hand threads whereas those extending along the other half of the shaft are left hand threads. The shaft is supported by end bearings 93 and 94 and a middle bearing 95. Secured to the upper end of the arm 80 is a pivotally connected bifurcated member 96 which supports an internally threaded sleeve 97 engaged on the threaded shaft 92 along one side of the shaft. The arm 81 is similarly provided with a bifurcated end member 98 supporting an internally threaded sleeve 99 which is threadedly engaged on the shaft 92 along the other side of the shaft. A power unit 100 is operatively connected to the shaft 92 by the gears 101 and 102 to effect rotation of the shaft in both directions. The power unit 100 may be any suitable form of power source, such as an electric motor. As the shaft is rotated the internally threaded sleeves 97 and 99 are driven along the length of the shaft, toward the center of the shaft or toward the ends depending upon direction of rotation, effecting movement of the arms 80 and 81 to cause rotation of each float chamber about its respective axis between horizontal and vertical positions. On the left or port side of the deck an identical system is positioned to operate the float chambers 15 and 20. The threaded shaft 92a is supported by the bearings 93a, 94a and 95a. A bifurcated cap member 96a supports an internally threaded sleeve 97a engaged on the shaft 92a. In a similar fashion at the other end of the shaft a bifurcated member 98a is engaged with an internally threaded sleeve 99a. The bifurcated members 96a and 98a are secured to the arms 80a and 81a connected to the float chambers 20 and 15, respectively, to actuate the float chambers between horizontal and vertical positions. The shaft 92a is rotated by a power unit 100a interconnected with the shaft by a power transmission unit 101a. Rotation of the shaft 92a effects movement of the float chambers 15 and 20 between horizontal and vertical positions in a manner identical to the operation of the float chambers 13 and 14. The arms along each side of the platform cross each other as shown in FIGURES 1 and 2. To avoid binding of the arms with each other the upper ends of each pair are connected on opposite sides of the shaft and the locations of the connection between the lower ends of each pair and the float chambers are displaced laterally from each other. By so locating the upper and lower ends of each pair of arms, each arm moves in a vertical longitudinal plane different from the plane of its companion arm, avoiding conflict as the float chambers revolve between horizontal and vertical positions.

Referring to FIGURE 3 a plurality of vertically extending brackets 105, 106 and 107 are secured to and suspended from the member 51. A strut 108 is connected to the float chamber 14 and is provided at its upper end with a sleeve 109 pivotally connected between the brackets 105 and 106. A similar strut 110 having an upper sleeve 111 is connected to the float chamber 15 and pivoted between the brackets 106 and 107. The struts 108 and 110 provide lateral support for the float chambers 14 and 15 irrespective of whether the float chambers are in horizontal or vertical position. Since the struts must rotate with the float chambers, it will be evident that the axis of rotation of sleeves 109 and 111 must be the same as the axis of rotation of the pin 61 so that the float chambers 14 and 15 and the struts 108 and 110 will rotate about the same axis as the float chambers and their related supporting structure revolve between horizontal and vertical positions.

The stern or back end of the floating platform is provided with identical structure as just described, pivotally interconnected between the float chambers 13 and 20 and the lateral truss extending across the back end of the platform to provide lateral support for the back float chambers.

Referring to FIGURE 3, propulsion units 120 and 121 are suspended from horizontal member 51 by support columns 122 and 123, respectively. The propulsion units may be any of the various outboard type marine engines which are currently used for propelling and maneuvering offshore drilling vessels. The propulsion units are suspended in such a manner that they may be rotated about the columns 122 and 123 or the columns themselves may be rotatable through a full 360 degrees so that maximum flexibility is available in maneuvering the working platform. The propulsion units preferably are controllable from a central station on the deck or within the deck house 22. The propulsion units may be used not only for maneuvering when on location but also for moving the working platform from one location to another.

When the float chambers are in the position illustrated in FIGURE 1 and the shafts 92 and 92a are rotated in the proper direction, the upward ends of the arms will be driven toward each other at the center of the deck causing the inward ends of the float chambers to be pushed downwardly until the long dimension of the float chambers will be in a vertical position perpendicular with the deck. Referring to FIGURE 2, when the arms are in the position which places the float chambers vertically, the upper ends of the arms will have traveled along the shafts toward each other near the middle of the deck. Rotation of the shafts in the opposite direction will, of course, move the upper ends of the arms outwardly from each other toward the opposite ends of the deck, retracting the lower ends of the float chambers back toward the center of the platform to return the float chambers to horizontal position. The threaded connection between the upper ends of the actuating members and the shafts are so constructed that when rotation of the shafts ceases the arm and consequently the float chambers will be locked in whatever position they were in at the time rotation of the shafts was stopped.

In operation, the working platform is usable in any depth of water. Generally any particular operation of the platform will be initiated when it is in relatively shallow water so that the float chambers will be in the horizontal position represented in FIGURE 1. In this position the platform may be moved under its own power or may be towed to the location where it is to be used. When the platform is being moved along the surface of the water the least resistance is encountered with the float chambers in horizontal position. The reaction force of the water against the movement of the float chamber is imposed on only a portion of the area of a section of the chambers taken in a plane transverse to the longitudinal axis of the chambers. This is to be contrasted with movement of the platform with the float chamber in vertical position when the water would resist the movement over an area of the float chamber measured by a longitudinal section through the chambers, which obviously is much greater than a cross-section through the chambers. A further reason for the platform being easier to move with the float chambers in horizontal position is that there is a tendency for the chambers to plane along the surface of the water due to the upwardly sloping surfaces 75 on the forward float chambers. If the location where the platform is to be used is an inland water covered area or any other water covered area where the water is so shallow that the float chambers may not be moved to vertical position, they will remain in the position illustrated in FIGURE 1 during the carrying out of operations from the platform. When the float chambers are n horizontal position the vessel is considered to be of the "catamaran type" which is a very stable form of a vessel due to its having a high metacenter. It does, however, have a short period of roll because the weight of the platform is supported in surface water which is subject to wave action. By a short period of roll it is meant that the time interval required for the platform to roll from side to side through one complete cycle is a very short period of time.

When the vessel is moved to a location where the water is of sufficient depth to safely permit the float chambers to be moved to vertical position, the float chambers are so moved by rotation of the shafts 92 and 92a forcing the arms downwardly to cause the float chambers to rotate about the pivotal connection between them and the truss members until the float chambers are in vertical position as illustrated in FIGURES 2 and 3. With the axis of pivotal movement of the float chambers being substantially at or just above the water line, the elevation of the deck above the water will change very little during their pivotal movement so that when the float chambers have been moved to their vertical positions the deck will be at the same elevation above the water that it was when the float chambers were in their horizontal position. With the float chambers in vertical position the platform becomes what is known as a "column-stabilized vessel," which has a very long period of roll since most of the length of the float chambers is below wave action and the platform is thus supported by deep water which does not move as much as the surface water. By a very long period of roll is meant that, as the vessel rolls with the sea, a substantial period of time is required for the vessel to roll through a complete cycle from a given angle back to that particular angle. This is particularly desirable when the vessel is being used in the open sea where the water surface may become very rough at times. Also, when the platform is on location, the float chambers may be in vertical position as resistance to movement is not a problem. While on location, the propulsion units are used to maneuver the vessel as required for carrying out the particular operation in which it is involved. If the platform is being used in very deep water, it may well be necessary for the propulsion units to be in constant operation to maintain the vessel on the proper location, such as over a well being serviced. Of course, the vessel also may be anchored if the depth of the water permits.

When it is desired that the plafotrm be moved onto another location or returned to port, it is preferred that the float chambers be returned to horizontal position so that the platform may be more readily moved. The shafts 92 and 92a are rotated in such a direction to urge the members 96 and 98 and 96a and 98a apart toward opposite ends of the vessel, which results in withdrawing the arms 80 and 81 and 80a and 81a upwardly to cause the float chambers to be pivoted upwardly toward the center of the platform until the float chambers are again in horizontal position.

While it has been indicated that the float chambers are pivoted near the water line so that during movement of the float chambers the deck will remain substantially at the same elevation above the water, it will be evident that utilization of the various chambers within the float chambers and the means for admitting water into and exhausting water from them may be employed to adjust the elevation of the deck. Allowing water to flow into the compartments within the float chambers will cause a lowering of the deck while exhausting the water from the float chambers will raise the elevation of the deck above the surface of the water. Since the platform is used around various wells, will have to be tied up to wharfs and docks, and may be moved under structures as bridges of the various heights, it is desirable that the elevation of the deck above the water surface be changeable as needed.

It will now be seen that there has been illustrated and described a new and improved form of working platform for supporting equipment and/or personnel above the surface of the water during various operations such as servicing offshore oil wells.

It will now also be seen that a new and improved type of floating work platform has been illustrated and described which platform has a variable draft permitting maximum buoyancy in water ranging from very shallow to very deep.

It will be further seen that the work platform is in the form of a catamaran type vessel when rigged for minimum depth operation with its movable float chambers in a horizontal position.

It will be further seen that the work platform when rigged for maximum depth operation assumes the form of a column-stabilized craft which has a very long period of roll in the water.

It will be further seen that there has been provided a working platform having movable float chambers which may be actuated from a horizontal position to a vertical position.

It will be further seen that there has been provided a floating work platform which when used in deep water presents a maximum transparency to wave action.

It will be further seen that there has been illustrated and described a floating work platform which is largely self contained in that it has capability of being moved from place to place and maneuvered on location under its own power, along with having structure and power means permitting adjustment of the elements of the platform for various depths of water.

It will be further seen that there has been provided a floating work platform in which the height of the main deck of the platform may be maintained substantially uniform irrespective of the depth of the water in which the platform is being used and the equipment and personnel being supported by the platform.

Figure 4:
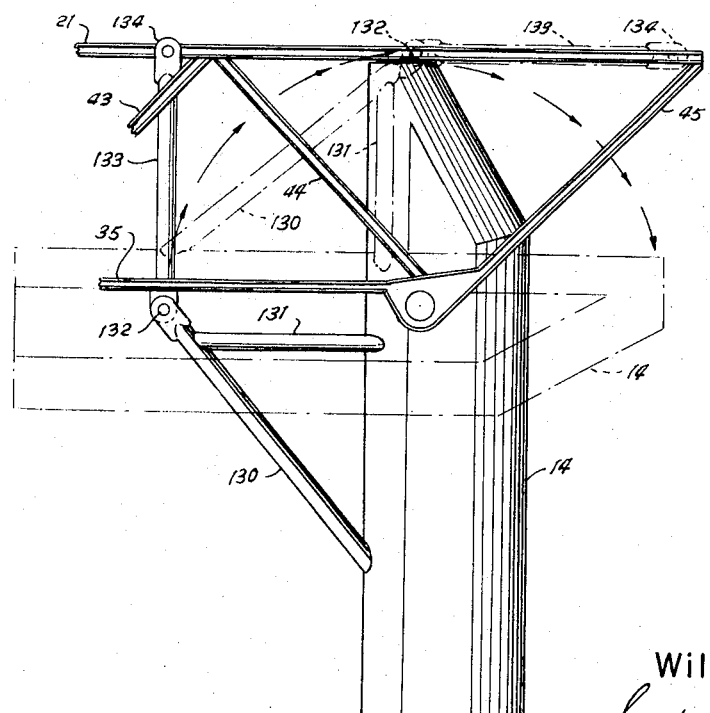
FIGURE 4 is a fragmentary side view in elevation of the platform illustrating a modified version of a portion of the float actuating mechanism.

It will be evident that various modifications may be made in the structure of the working platform. By way of specific example, FIGURE 4 illustrates an alternative embodiment of mechanism utilized for rotating the float chambers. Referring specifically to FIGURE 4, the arm 80 as shown in FIGURES 1 and 2 has been replaced by a system of connecting members for moving the float chamber between horizontal and vertical positions. A member 130 is secured to the float chamber 14 at an upward and outward angle and reinforced by brace 131 extending from the member 130 to the float chamber. Connected to the member 130 by a pin 132 is a link 133. Secured on the end of the link is a head member 134 which is provided with a pivotally mounted internally threaded sleeve, not shown, which is threadedly engaged to the shaft 92. Rotation of the shaft 92 causes movement of the head member 134 along the length of the shaft adjusting the position of the float chamber between horizontal and vertical. The solid line representation of the float chamber and actuating mechanism in FIGURE 4 shows the float chamber in vertical position, while the broken line representation of the float chamber and actuating members illustrate the float chamber in the horizontal position. It will be obvious that, if the embodiment of FIGURE 4 is employed, each of the floats will be similarly connected to the actuating mechanism on the deck.

Other variations in the structure of the floating platform may readily be made within the spirit of the invention. The shafts 92 and 92a used to actuate the movable float chambers may be replaced by a rack and pinion arrangement with a powered pinion located on the upper end of each of the actuating members 80 and 81 and 80a and 81a so that the upper end of the actuating member can be caused to travel along the length of the rack. A hydraulic or any other mechanical system may be utilized to move the float chambers between horizontal and vertical positions. Any desired number of propulsion units such as the propulsion units 120 and 121 may be employed. For example, the platform may utilize four of the propulsion units with one being located at each corner of the platform.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A variable draft floating platform comprising in combination: a deck for supporting equipment and personnel; a plurality of elongated float chambers providing the sole buoyancy means for said deck, each of said chambers having a long dimension substantially greater than the maximum cross-sectional dimension; structure interconnecting said float chambers and said deck whereby said deck is supported above the surface of the water when said float chambers are floating in a body of water including a pivotal connection with each of said float chambers located at a point between the middle and the end of the long dimension of said chambers permitting the long dimension of each of said chambers to be rotated without changing the displacement of said chambers between a horizontal position for minimum draft operation and a vertical position for maximum draft operation; said float chambers when in said horizontal and vertical positions providing a support maintaining said deck at the same elevation above the surface of the water, and when in said vertical position extending below the surface wave action of the body of water and providing a stable wave transparent support for said deck; and means operatively connected with said deck and with each of said float chambers for positively mechanically moving each of said chambers between said horizontal and said vertical positions and for locking each of said chambers in a position ranging from vertical to horizontal.

2. A variable draft floating platform comprising in combination: a deck; supporting structure secured to said deck; and a plurality of laterally spaced parallel elongated float chambers pivotally connected adjacent their ends with said supporting structure, said float chambers being connected to said structure in sets spaced longitudinally of said deck, said pivotal connection providing that each of said chambers may be rotated between a horizontal and a vertical position about an axis running substantially transverse to the longitudinal axis of said float chamber, said float chambers providing the sole buoyancy means for said deck, and when in vertical position providing a stable wave transparent buoyancy means extending below the surface wave action of the body of water in which the float chambers are floating, the axis of rotation of each of said float chambers being located substantially at the normal water line of said working platform whereby the float chambers may be moved from horizontal to vertical positions and back without changing their buoyancy so that the elevation of said platform will remain substantially uniform during the transition of said float chambers between horizontal and vertical positions; and operating means interconnecting the deck and said float chambers for positively mechanically moving said chambers to said horizontal and said vertical positions and for locking said chambers in said positions.

3. A variable draft floating work platform comprising in combination: a deck; truss members secured to and supporting said deck above the surface of the water; elongated float chambers pivotally secured to said truss members, each of said float chambers being secured along an axis extending transverse to the longitudinal axis of said chamber whereby said chamber is rotatable with its long dimension revolving about the pivot point at which said chamber is secured; an arm pivotally connected with each of said float chambers; and power means operatively connected with each arm on each of said float chambers for rotating each of said chambers between a horizontal and a vertical position.

4. A variable draft floating work platform comprising in combination: a deck; structure comprising truss members secured to said deck for supporting said deck above the surface of the water; elongated float chambers pivotally connected to said truss members along an axis running transverse to the longitudinal axis of said float chambers whereby said float chambers may be rotated between horizontal and vertical positions with a long dimension of said float chambers rotating about a cross-sectional dimension of each of said chambers; an arm pivotally connected at one end with each of said float chambers and connected at the other end to means for moving said arm, the positions of said arms and the points of connection with said float chambers being such that when said float chambers are in horizontal retracted position said arms are connected with the inward ends of said float chambers and such ends of said float chamber rotate downwardly and outwardly as said float chambers are moved to vertical position.

5. A variable draft floating work platform comprising in combination: a deck; structure secured to said deck for supporting said deck above the surface of the water; a plurality of elongated float chambers pivotally secured to said deck supporting structure, each of said float chambers being secured along an axis running transverse to the longitudinal axis of said chamber; and means operatively associated with said float chambers for moving said float chambers from a first horizontal position when the inward ends of said float chambers are adjacent to each other to a vertical position, the movement of the inward ends of said chambers being downwardly and outwardly and the movement of the outer ends of said float chambers being upwardly and inwardly toward said deck.

6. A variable draft floating work platform comprising in combination: a deck; truss members secured to and supporting said deck above the surface of the water; two elongated float chambers secured to said truss members at each end of said deck, said float chambers being spaced apart from each other and positioned substantially parallel to each other with the long axis of each of said float chambers extending along the length of said deck when said chambers are in horizontal position; structure pivotally securing each of said float chambers to said trusses along an axis of each float chamber extending perpendicular to the longitudinal axis of said float chamber at a location along the length of said float chamber positioning a major portion of the length of each float chamber toward the center of said deck when said float chamber is in the horizontal position, the connection between said trusses and float chambers being such that said float chambers may be rotated between a horizontal position when the longitudinal axis of said float chambers is substantially parallel to said deck to a vertical position when the longitudinal axis of said float chambers is substantially perpendicular to said deck; an arm secured by a pivot connection at its lower end to the inward portion of each of said float chambers when each of said chambers is in horizontal position, each of said arms being operatively connected to structure on said deck for actuating said arms to move said float chambers between horizontal and vertical positions, said float chambers being moved from a horizontal position to a vertical position by moving the inward ends of said float chambers downwardly and outwardly with the outward ends of said chambers moving upwardly and inwardly toward said deck.

7. A variable draft floating work platform adapted to be converted between a catamaran type vessel and a column-supported type vessel comprising in combination: a deck; truss-like structure for supporting said deck above the water; a pair of sets of laterally spaced parallel elongate float chambers comprising the sole buoyancy means for said vessel, one of said sets of float chambers being pivotally secured at each end of said truss-like structure and spaced apart longitudinally from the other and disposed with the float chambers of each set in longitudinal alignment with the float chambers of the other set, each float chamber being secured pivotally to said support structure between its mid-point and one end along an axis transverse to its longitudinal axis, each set of float chambers having a major portion of said float chambers of said set on one side of the pivotal support and a minor portion on the other side of said support whereby the float chambers may be moved to a horizontal position parallel to said deck and a vertical position vertical to said deck without changing the displacement buoyancy of said float chambers, whereby the deck is supported by said float chambers at the same elevation above the surface of the water when said float chambers are in either of said positions, the major portion of said float chamber being near the center of said deck when said float chamber is in horizontal longitudinally aligned position to provide said catamaran type vessel; and means interconnected between said deck and said float chambers for positively mechanically moving said float chambers between a horizontal and a vertical position, said major portion of said float chambers when in said vertical position extending to relatively still water beneath the surface wave action of the body of water in which they are disposed to provide a stable wave transparent support for said deck.

8. A variable draft work platform convertible between a catamaran type vessel and a column-stabilized type vessel comprising in combination: a substantially rectangular deck; truss structures secured to said deck for supporting said deck above the surface of the water, said truss structures extending both longitudinally and laterally of said deck; a pair of float chambers pivotally secured between the longitudinal trusses spaced apart from each other at the front of the platform, each of said float chambers being pivotally engaged between the longitudinal trusses along an axis extending substantially transverse to the longitudinal axis of said float chamber at a location along the length of said float chamber so that a major portion of said float chamber will be positioned behind the pivot point and the center of the platform when the float chamber is in horizontal position; a pair of elongated float chambers pivotally secured between the longitudinal trusses at the rear of said platform, each of said float chambers being secured along an axis running substantially transverse to the longitudinal axis of said chamber at a location along the length of said chamber placing the major portion of the length of said chamber in a forward position toward the middle of said platform when said chamber is in a horizontal position; the pivot points between said trusses and said float chambers being near the water line so that when the position of said chambers is changed the height of said deck above the water line will remain substantially unchanged; linking structure secured to each of said float chambers for moving each of said chambers about its respective pivot point between horizontal and vertical positions with the major portion of each of said float chambers being rotated downwardly and outwardly away from the center of said platform to move said chamber from horizontal to vertical position; and power means operatively associated with said linking structure to actuate said linking structure for moving said float chambers between horizontal and vertical position.

9. Apparatus in accordance with claim 8 wherein said linking structure includes an arm pivotally secured to each of said float chambers near the end of said chamber on the major portion thereof and said actuating means includes structure operatively associated with the other end of each of said arms for moving said other ends through a path of travel along the length of said deck to force the ends of said arms connected to said float chambers downwardly and outwardly away from the center of said platform to move said float chambers between horizontal and vertical positions.

10. Apparatus in accordance with claim 8 wherein each said linking structure comprises an arm pivotally secured at its lower end to the major portion of each of said float chambers near the end of said major portion whereby said major portion may be forced downwardly and outwardly from the center of the platform to move the float chambers from horizontal to vertical position and upwardly and inwardly toward the center of the platform to move the float chambers from vertical to horizontal position, an externally threaded elongated shaft extending down each side of said deck, a pivotally mounted bifurcated member having an internally threaded sleeve secured thereto on the upper end of each of the said arms, each said sleeve being threadedly engaged on one of said shafts whereby rotation of said shaft will cause said sleeve to move along the length of said shaft to move the arm associated with the said sleeve to change the position of the float chamber pivotally secured to said arm; and means for rotating said shaft in either direction.

11. Apparatus in accordance with claim 10 including propulsion means suspended from said truss structures for maneuvering said platform in the water.

12. A variable draft floating work platform comprising in combination: a deck; truss structure secured to said deck for supporting said deck above the surface of the water, said truss structure including longitudinal and lateral truss members; a pair of elongated float chambers spaced apart from each other and pivotally secured between longitudinal trusses at the forward end of said platform, the pivot connection between each of said float chambers and said trusses being along a line substantially transverse to the longitudinal axis of each float chamber and at a location along the length of said longitudinal axis positioning the major portion of the length of said float chamber toward the center of said platform when said float chamber is in a horizontal position; a pair of elongated float chambers spaced apart from each other and pivotally secured between longitudinal trusses at the aft end of said platform, each of said float chambers being secured along an axis substantially transverse to the longitudinal axis of said chamber at a location along the length of said longitudinal axis positioning the major portion of the length of said float chamber in a forward direction toward the center of said platform when said float chamber is in horizontal position; a float actuating member secured to each float chamber at a location spaced apart from the pivot connection with said float chamber along said major portion of said float chamber and extending toward the pivotal connection with said float chambers and outward from the float chamber on the side of the float chamber facing said deck when said float chamber is in horizontal position; a link pivotally secured at one end to said actuating member on each float chamber; a bifurcated member pivotally secured to the other end of each link; an internally threaded sleeve secured in each bifurcated member; an externally threaded shaft extending down each side of said deck, the internally threaded sleeve on each of said links being threadedly engaged on one of said shafts whereby rotation of each of said shafts in one direction will urge the float chambers interconnected with said shaft between a horizontal position relative to said deck toward a vertical position relative to said deck and movement of said shaft in the other direction will urge the float chambers interconnected with said shaft between vertical position relative to said deck toward a horizontal position relative to said deck; power means connected with said shafts to rotate said shafts in either direction to drive the internally threaded sleeves on said shaft along the length of said shaft for actuating said float chambers between horizontal and vertical positions; a lateral brace member secured at one end to the major portion of each of said float chambers at a location along the length of said float chamber away from the pivotal connection between said float chamber and said trusses; the lateral brace members for each pair of said float chambers extending toward the pivot connection on each of said chambers and inwardly toward the center line of said platform; and structure supported from one of the lateral trusses pivotally connected to the other ends of each pair of lateral brace members along a line coincident with the line of pivotal connection between the longitudinal trusses and pair of float chambers connected with said lateral brace members whereby said lateral brace members will revolve about a pivot line coincident with the pivot line about which the float chambers connected with said braces revolve.

13. Apparatus in accordance with claim 12, including propulsion means suspended from said trusses for maneuvering said platform in the water.

14. A floating work platform comprising: deck means; a plurality of elongate float chamber means comprising the sole bouyancy means for said deck means; means swingably interconnecting said float chamber means with said deck means intermediate the ends of said elongate float chamber means for swingable movement between horizontal position parallel to said deck means and vertical position vertical to said deck means, said swingable connection of said float chamber means providing for movement of said float chamber means from horizontal to vertical positions without changing the displacement of said float chamber means whereby said deck means remains at substantially the same elevation above the water when said float chamber means is in either of said positions, said float chamber means when in said vertical providing a stable wave transparent support for said deck means; and means for positively mechanically moving said float chamber means to said horizontal and vertical positions.

15. A floating work platform of the character set forth in claim 14 including: lock means for locking said float chamber means in said horizontal and in said vertical positions.

16. A floating work platform including: deck means for supporting equipment and personnel; a plurality of longitudinally spaced sets of laterally spaced parallel elongate float chamber means swingably interconnected intermediate their ends with said deck means and providing the sole floating support for said deck means, said float chamber being movable between horizontal positions parallel to said deck means and positions vertical to said deck means, said float chamber means of each set when in horizontal position being longitudinally aligned with the float chamber means of said other set or sets; said swingable mounting of said float chamber means providing for movement thereof from horizontal to vertical position without changing the displacement of said float chamber means whereby said deck means is maintained at substantially the same elevation above the surface of the water when said float chamber means is in either of said positions, said float chamber means when in said vertical position providing a stable wave transparent support for said deck means; and operating means interconnecting said deck means and said float chamber means for positively mechanically moving said float chamber means between said horizontal and vertical positions.

17. A floating work platform adapted to be converted between a catamaran type vessel and a column supported type vessel and including: a deck for supporting equipment and personnel; a plurality of longitudinally spaced sets of laterally spaced parallel elongate floats; support structure connected with said deck and pivotally interconnected with each of said floats at a point between the mid-portion and one end of said float, said pivotal connection providing for swingable movement of said float about an axis transverse to the longitudinal axis of said float from a position in which said float extends horizontally parallel to said deck and a vertical position, the major portion of said float extending vertically downwardly from said deck when in said vertical position; and means operatively interconnecting said floats and said deck for positively moving said floats to said horizontal and said vertical positions and for locking said floats in said positions; said floats providing the sole buoyancy means for said vessel and being movable about said pivotal connection from horizontal to vertical positions and back without changing the buoyancy of said floats for maintaining the deck at a substantially constant level above the surface of the water, said floats of each set when in horizontal position being disposed in longitudinal alignment with the floats of the other set to provide a catamaran type vessel and when in said vertical position extending downwardly below the surface wave action of the water to provide a stable wave transparent support for said deck.

References Cited
UNITED STATES PATENTS

| | | | |
|---|---|---|---|
| 2,598,329 | 5/1952 | Wilson | 61—46.5 |
| 2,608,829 | 9/1952 | Knapp | 61—46.5 |
| 3,054,267 | 9/1962 | Alcorn et al. | 61—46.5 |
| 3,273,256 | 9/1966 | Glosten | 114—0.5 |
| 3,306,052 | 2/1967 | Kawasaki | 114—0.5 X |

MILTON BUCHLER, *Primary Examiner.*

FERGUS S. MIDDLETON, *Examiner.*

T. M. BLIX, *Assistant Examiner.*